(12) United States Patent
Dorothy et al.

(10) Patent No.: US 9,764,633 B1
(45) Date of Patent: Sep. 19, 2017

(54) ELECTRIC DRIVETRAIN SYSTEM AND METHOD HAVING A SINGLE SPEED RATIO DIRECT DRIVE

(71) Applicant: Caterpillar Inc., Peoria, IL (US)

(72) Inventors: Joshua Dorothy, Dunlap, IL (US); Rodwan Adra, Peoria, IL (US); Edward Zwilling, Washington, IL (US); Corey Kauk, Peoria, IL (US); Joseph Tigue, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/071,771

(22) Filed: Mar. 16, 2016

(51) Int. Cl.
| | |
|---|---|
| *B60K 6/50* | (2007.10) |
| *B60K 6/46* | (2007.10) |
| *B60K 6/547* | (2007.10) |
| *B60K 6/52* | (2007.10) |
| *B60W 20/10* | (2016.01) |
| *B62D 65/02* | (2006.01) |
| *E02F 9/20* | (2006.01) |
| *B60L 11/02* | (2006.01) |
| *E02F 3/34* | (2006.01) |

(52) U.S. Cl.
CPC ............... *B60K 6/50* (2013.01); *B60K 6/46* (2013.01); *B60K 6/52* (2013.01); *B60K 6/547* (2013.01); *B60L 11/02* (2013.01); *B60W 20/10* (2013.01); *B62D 65/02* (2013.01); *E02F 9/2075* (2013.01); *B60L 2200/40* (2013.01); *B60W 2300/17* (2013.01); *B60W 2510/00* (2013.01); *B60W 2510/08* (2013.01); *B60W 2710/00* (2013.01); *B60W 2710/08* (2013.01); *B60Y 2200/92* (2013.01); *B60Y 2300/188* (2013.01); *B60Y 2300/60* (2013.01); *B60Y 2400/60* (2013.01); *B60Y 2400/70* (2013.01); *B60Y 2400/78* (2013.01); *B60Y 2400/82* (2013.01); *E02F 3/34* (2013.01); *Y10S 903/915* (2013.01); *Y10S 903/916* (2013.01); *Y10S 903/919* (2013.01); *Y10S 903/93* (2013.01)

(58) Field of Classification Search
CPC ........ B60K 6/50; B60K 6/4652; B60K 6/547; B60L 11/02
See application file for complete search history.

(56) References Cited

U.S. PATENT DOCUMENTS 5,457,363 A * 10/1995 Yoshii ................. B60L 15/2009
                                                                180/282
5,632,352 A    5/1997 Jeanneret et al.
(Continued)

*Primary Examiner* — Erez Gurari

(57) ABSTRACT

A machine having a series electric drivetrain system includes an engine to provide mechanical energy to an electric generator, the electric generator able to convert the mechanical energy received from the engine into electrical energy, the electric generator including an input shaft extending through the electric generator, a rotor to rotate on the input shaft, and the input shaft is able to rotate an input gear, an idler gear, a pump drive gear, and a rotor gear, a motor to receive the electrical energy and to produce a rotational output, a single speed ratio direct drive to transfer the rotational output of the motor to a torque output to deliver to a drive shaft, and power electronics to control the electrical energy between the electric generator and the motor and to regulate the rotational output of the motor.

20 Claims, 4 Drawing Sheets

(56) References Cited

U.S. PATENT DOCUMENTS

| | | | |
|---|---|---|---|
| 6,672,415 B1* | 1/2004 | Tabata | B60K 6/365 180/65.25 |
| 7,201,244 B2 | 4/2007 | Johnston et al. | |
| 7,301,302 B2* | 11/2007 | Yoshii | B60K 6/26 180/65.1 |
| 7,427,849 B2 | 9/2008 | Kaneko et al. | |
| 7,495,411 B2 | 2/2009 | Kaneko et al. | |
| 7,635,039 B2 | 12/2009 | Fujiwara et al. | |
| 7,812,555 B2 | 10/2010 | Adra | |
| 7,957,855 B2 | 6/2011 | Seo et al. | |
| 8,424,622 B2* | 4/2013 | Ideshio | B60K 6/365 180/65.225 |
| 8,584,543 B2* | 11/2013 | Gitt | F16H 3/006 74/331 |
| 9,617,714 B2* | 4/2017 | Ishihara | E02F 9/2075 |
| 2005/0193719 A1* | 9/2005 | Sumilla | F02D 41/0082 60/285 |
| 2005/0193721 A1* | 9/2005 | Surnilla | F02D 41/0087 60/285 |
| 2005/0197236 A1* | 9/2005 | Doering | F02D 41/0087 477/181 |
| 2007/0107960 A1* | 5/2007 | Takami | B60K 6/405 180/65.6 |
| 2009/0095548 A1* | 4/2009 | Tamba | B60K 6/365 180/65.21 |
| 2010/0012405 A1* | 1/2010 | Katsuta | B60K 6/387 180/65.22 |
| 2010/0113213 A1* | 5/2010 | Oba | B60K 6/445 477/5 |
| 2011/0251747 A1* | 10/2011 | Imai | B60K 6/445 701/22 |
| 2013/0116077 A1* | 5/2013 | Tamai | B60K 6/365 475/5 |
| 2014/0243149 A1* | 8/2014 | Holmes | B60W 20/40 477/5 |
| 2015/0219193 A1* | 8/2015 | Nitsch | F16H 37/046 475/219 |

* cited by examiner

ELECTRIC DRIVETRAIN SYSTEM AND METHOD HAVING A SINGLE SPEED RATIO DIRECT DRIVE

TECHNICAL FIELD

This disclosure relates to an electric drivetrain system and method having a single speed ratio direct drive.

BACKGROUND

A drivetrain system on some machines, such as a wheel loader, may include a torque converter and a multispeed transmission as part of a mechanical drivetrain package. In some applications for machines, however, an electric drivetrain system may be desirable. Existing electric drivetrain systems typically require a multispeed drivetrain in order to meet run out speeds comparable to a performance provided by a mechanical drivetrain. Moreover, replacing mechanical drivetrain systems with electric drivetrain systems may require significant modification to the machine in order to meet the same performance. In this regard, electric drivetrain systems typically require electrical components which do not fit within a comparable space as mechanical drivetrain system components. This limits the adaptability of machines to implement an electric drivetrain system in lieu of a mechanical drivetrain system.

An electric drivetrain system replacing a mechanical drivetrain system includes an engine, a generator, a multispeed transmission, and a gear reduction. The multispeed transmission in combination with an electric motor and/or generator results in an electrical space claim that is larger than the mechanical drivetrain space claim associated with the mechanical drivetrain system. This is at least in part because the multispeed transmission and the electric motor are added to the drivetrain of the electrical system. Accordingly, replacing a mechanical drivetrain system with an electric drivetrain system requires significant architectural modification of the machine due to the substantially increased space claim of the electrical drivetrain system.

U.S. Pat. No. 7,957,855, titled "Control system for hybrid vehicle," discloses a hybrid vehicle with a generator coupled to a single electric motor through a switch to supply current from a generator to a motor to drive a vehicle. However, this patent does not provide a configuration for an electric drivetrain system to fit substantially within the same space as a comparably performing mechanical drivetrain system.

Accordingly, an electric drivetrain system which can replace a mechanical drivetrain system while substantially fitting within the same space, and which can meet the performance of the mechanical drivetrain system is needed.

SUMMARY

In one aspect of the present disclosure, a machine having a series electric drivetrain system includes an engine to provide mechanical energy to an electric generator, the electric generator able to convert the mechanical energy received from the engine into electrical energy, the electric generator including an input shaft extending through the electric generator, a rotor to rotate on the input shaft, and the input shaft is able to rotate an input gear, an idler gear, a pump drive gear, and a rotor gear, a motor to receive the electrical energy and to produce a rotational output, a single speed ratio direct drive to transfer the rotational output of the motor to a torque output to deliver to a drive shaft, and power electronics to control the electrical energy between the electric generator and the motor and to regulate the rotational output of the motor. In another aspect of the present disclosure, a machine includes a series electric drivetrain system, an engine to provide mechanical energy to an electric generator, the electric generator to convert the mechanical energy received from the engine into electrical energy, a motor to receive the electrical energy and to produce a rotational output, a single speed ratio direct drive to transfer the rotational output of the motor to a torque output to deliver to a drive shaft, and power electronics to transmit the electrical energy between the electric generator and the motor and to regulate the rotational output of the motor, wherein the electric generator, the power electronics, and the motor are positioned between the engine and a gear reduction in an area defining a series electric drive space claim that is comparable to a mechanical drivetrain space claim defined by a mechanical drivetrain system having a motor with a multispeed transmission, and the series electric drivetrain system is configured to operate in place of the mechanical drivetrain system.

In another aspect of the present disclosure, a machine includes an engine to provide mechanical energy to an electric generator, the electric generator able to convert the mechanical energy received from the engine into electrical energy and into hydraulic power, and the electric generator including an input shaft extending through the electric generator, a rotor to rotate on the input shaft, and the input shaft is able to rotate an input gear, an idler gear, a pump drive gear, and a rotor gear, a motor to receive the electrical energy and to produce a rotational output; a single speed ratio direct drive to transfer the rotational output of the motor to a torque output to deliver to a drive shaft, and power electronics to transmit the electrical energy between the electric generator and the motor and to regulate the rotational output of the motor.

In another aspect of the present disclosure, a method of replacing a mechanical drivetrain system with a series electric drivetrain system includes removing mechanical components from the mechanical drivetrain system, and replacing the mechanical components of the mechanical drivetrain system with power electronics and with electrical components of the series electric drivetrain system, wherein the electrical components of the series electric drivetrain system comprise a switched reluctance motor and an electric generator with an input shaft extending through the electric generator, the electrical components positioned between an engine and a single speed ratio direct drive in an area defining a series electric drive space claim that is comparable to a mechanical drivetrain space claim defined by the mechanical drivetrain system.

DETAILED DESCRIPTION

Figure 1:
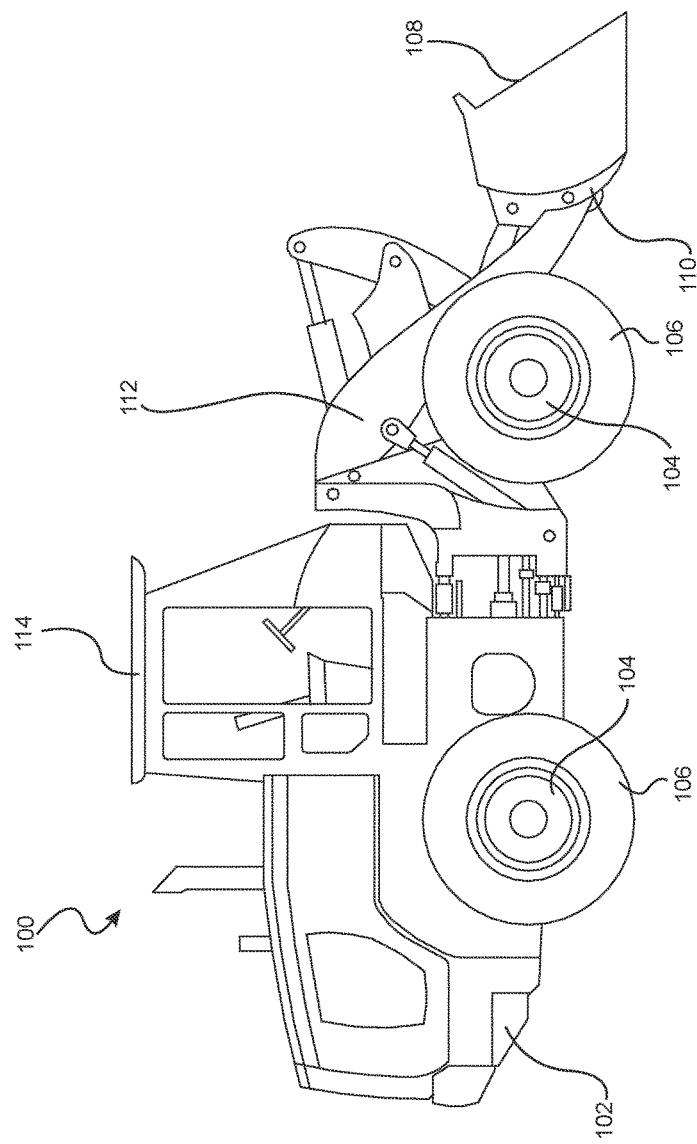
FIG. 1 illustrates an exemplary machine according to the disclosure.

FIG. 1 illustrates an exemplary aspect of a machine according to the disclosure. In particular, FIG. 1 illustrates an exemplary view of a machine 100, which may be a wheel loader, track-type tractor, or the like. The machine 100 may include a body portion 102, which may house an engine to drive ground engaging members 104, such as rear wheels and/or front wheels, each of which may include tires 106. Other types of ground engaging members 104 are contemplated as well, including track type ground engaging members and the like.

An implement 108, such as a bucket or the like, may be attached or coupled at a front end of the machine 100 with a coupler 110 or the like. The coupler 110 may secure the implement 108 and may allow for the removal and/or changing of the implement 108 for another. The machine 100 may include a pair of lift arms 112 that may connect the coupler 110 to the machine 100. The lift arms 112 may rotate to raise and lower the implement 108. Other types of electrical, mechanical, and/or hydraulic mechanisms are contemplated as well for connecting and operating the implement 108. The operation of the lift arms 112 and other components of the machine 100 may be controlled by an operator inside of a cab 114. Alternatively, the machine 100 may be controlled autonomously.

Figure 2:
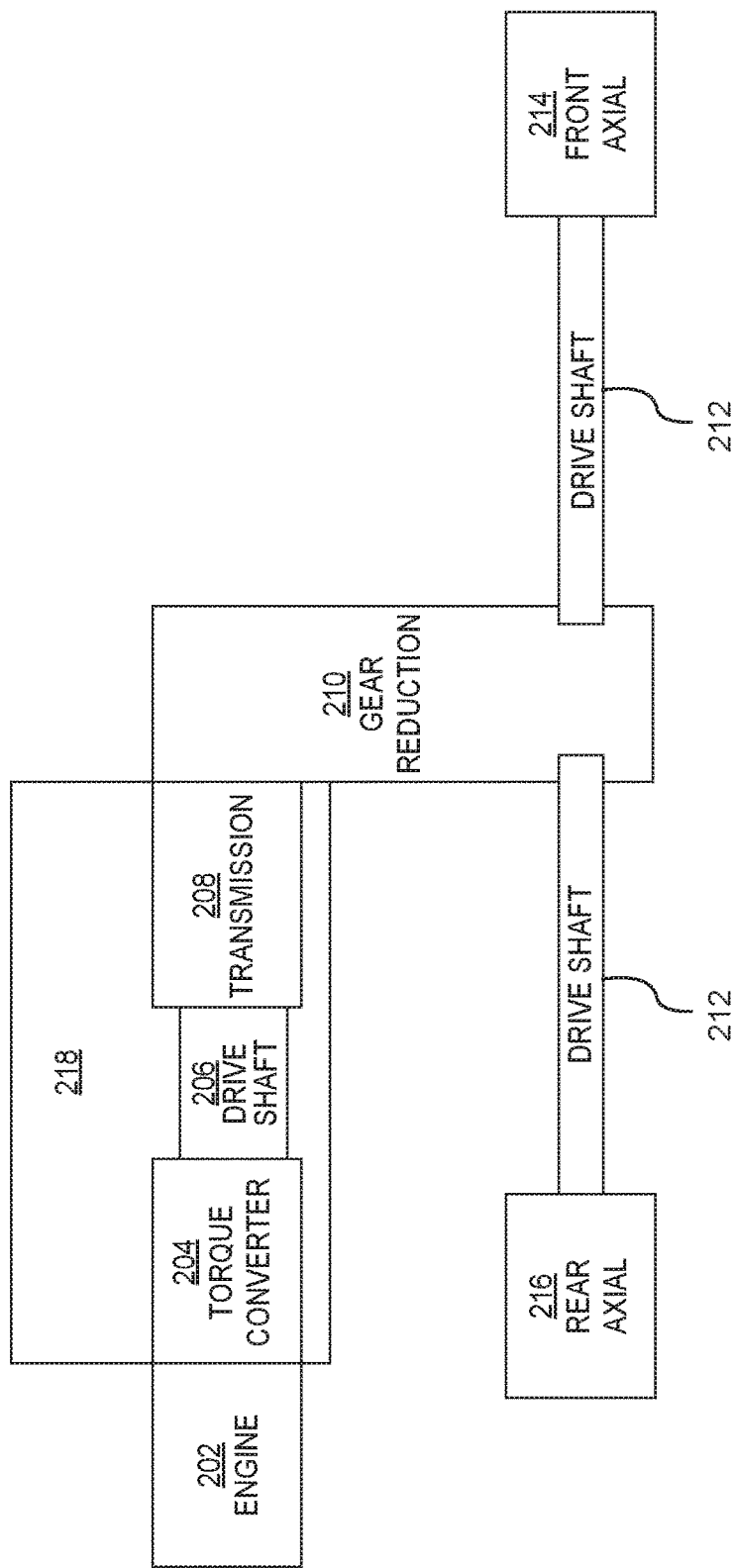
FIG. 2 illustrates a schematic of an exemplary mechanical drivetrain system for the machine of FIG. 1.

FIG. 2 illustrates a schematic of an exemplary mechanical drivetrain system for the machine of FIG. 1. The mechanical drivetrain system of FIG. 2 includes an engine 202, which may provide a rotational output having a speed and torque to a torque converter 204. A drive shaft 206 may operably link the torque converter 204 with a multispeed transmission 208 to transfer the output of the torque converter 204. The multispeed transmission 208 may produce a rotational output that is input to a gear reduction 210. The multispeed transmission 208 may include multiple gears, multiple speeds, and the like to perform a desired run out speed, a desired stall torque, and the like.

The gear reduction 210 may be implemented as a differential and may be a gear train which allows a different rotational velocity for one or more of the ground engaging members 104. This difference in velocity may be necessary in some aspects, for example, when the machine 100 turns. For example, when an outside wheel needs to rotate faster than an inside wheel to execute a turn. Other implementations of the gear reduction 210 are contemplated as well.

The gear reduction 210 may connect to and drive, with respective drive shafts 212, a front axial 214 and a rear axial 216. The front axial 214 may be operatively connected to and drive a front one of the ground engaging members 104. Likewise, the rear axial 216 may be operatively connected to and drive a rear one of the ground engaging members 104. In an aspect of the disclosure, the front axial 214 and the rear axial 216 may control a rotation of the front one of the ground engaging members 104 and the rear one of the ground engaging members 104 with separate, respective differentials. Other configurations for delivering torque from the gear reduction 210 to the ground engaging members 104 are contemplated as well.

A space claim is the amount of space a particular group of components requires or claims. For example, a space claim may include an amount of area, an amount of volume, and the like. The mechanical drivetrain space claim 218 illustrated in FIG. 2 may include the torque converter 204, the drive shaft 206, and the multispeed transmission 208 of the mechanical drivetrain. The differences between the mechanical drivetrain space claim 218 and a series electric drivetrain space claim are examined below.

Figure 3:
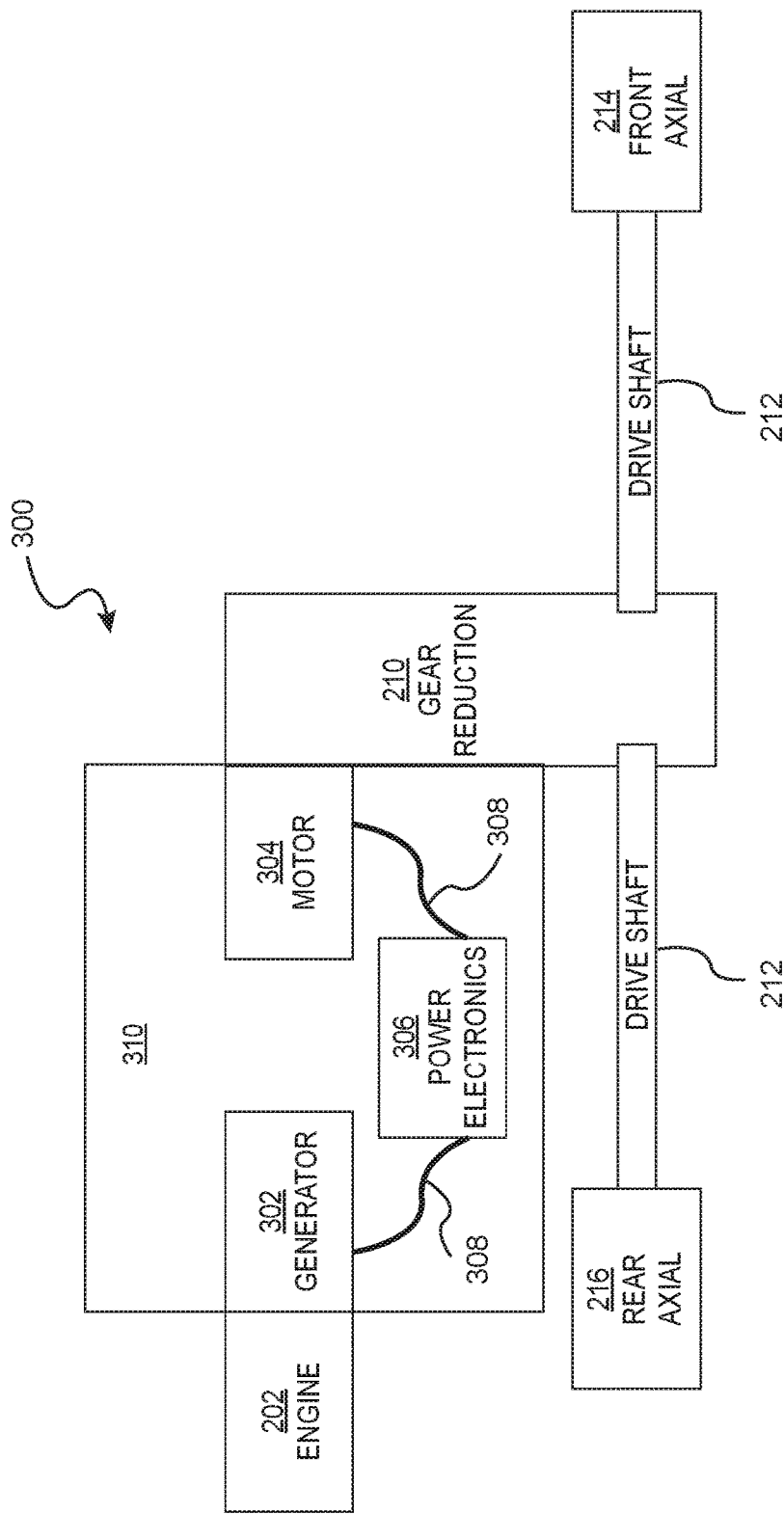
FIG. 3 illustrates a schematic of a series electric drivetrain system with a switched reluctance motor for the machine of FIG. 1 according to the disclosure.

FIG. 3 illustrates a schematic of a series electric drivetrain system with a motor for the machine of FIG. 1 according to the disclosure. In particular, FIG. 3 shows a series electric drivetrain system 300 implemented as described below to operate without a multispeed transmission. In other words, the series electric drivetrain system 300 may be implemented with a single speed ratio direct drive. The series electric drivetrain system 300 may operate with a generator 302, a switched reluctance motor 304, and power electronics 306 connected via power connections 308. It is contemplated that the motor may be implemented using a different kind of motor as long as it can meet the same performance as the switched reluctance motor 304 in combination with the single speed ratio direct drive.

A series electric drivetrain space claim 310 of the series electric drivetrain system 300 of FIG. 3 may include the generator 302 and the switched reluctance motor 304, which may be connected to the power electronics 306 by one or more power connections 308, such as a cable. The generator 302 may be a three-phase magnet alternating field-type generator, a switched reluctance generator, a direct phase generator, or the like, and may use an inverter.

The series electric drivetrain system 300 illustrated in FIG. 3 can match the performance of a mechanical drivetrain system, such as the one illustrated in FIG. 2, by using the single speed ratio direct drive with a switched reluctance motor 304 and the power electronics 306, and may have a series electric drivetrain space claim 310 which is comparable to the mechanical drivetrain space claim 218. The series electric drivetrain space claim 310 being comparable to the mechanical drivetrain space claim 218 may mean that the length, width, and/or volume defining each space claim are equivalent or within 5% of the length, width, and volume defining the other space claim. In addition, the performance of the series electric drivetrain system 300 may include a run out speed and a stall torque that are comparable to the performance of the mechanical drivetrain system.

The series electric drivetrain space claim 310 may include the switched reluctance motor 304 in order to meet the performance of the replaced mechanical drivetrain system. A switched reluctance motor 304 operates with reluctance torque, and may use a stator to receive power instead of a mechanically moving rotor. The stator may have windings, but the rotor may not. A switched reluctance motor 304 may facilitate motion resulting from variable reluctance in a gap between the rotor and stator. As a winding of the stator becomes energized, reluctance torque is produced from a magnetic field. The direction of the torque produced may be a function of rotor position relative to an energized phase. The number of phases on a switched reluctance motor 304 may vary, corresponding with a varying number of rotors and stators. The switched reluctance motor 304 may also use an asymmetric bridge converter for power. Because the stator of a switched reluctance motor 304 may receive power instead of the rotor, the rotor may not encounter flux reversals. Instead, all of the flux reversals in a switched reluctance motor 304 may occur with the stator. The switched reluctance motor 304 may also use a ratio adjuster with a high-speed planetary gear set to achieve the constant speed ratio of the multispeed transmission 208 with the same stall torque requirements.

In an alternative aspect of the disclosure, the generator 302 may power multiple switched reluctance motors 304. The one or more switched reluctance motors 304 may be operatively linked with a gear train or the like. In an aspect with multiple switched reluctance motors 304, the front axial 214 and rear axial 216 may each be operatively coupled with a switched reluctance motor 304 to individually drive each axial.

Each switched reluctance motor 304 may be electronically linked, via power connections 308 such as cables or the like, to power electronics 306. The power electronics 306 may be configured to control the switched reluctance motor 304 so that the series electric drivetrain system 300 of FIG. 3 may meet the performance of the mechanical drivetrain system in FIG. 2 without a multispeed transmission and other significant modification. The power electronics 306 may include one or more power electronics units and may be electronically coupled to the generator 302 and the switched reluctance motor 304, thereby removing the need for a mechanical connection which may be included in a mechanical drivetrain system. The electrical connections between the power electronics 306, the switched reluctance motor 304, and the generator 302 allow the power electronics 306 to manage the connection between the generator 302 and the switched reluctance motor 304.

The power electronics 306 may include a power inverter for DC-AC conversion, a controller for an inverter, one or more units or modules for controlling the power conversion from mechanical to electrical, a rectifier for AC-DC conversion, a power converter, diodes, thyristors, transistors, MOSFETs, and the like. For example, the power electronics 306 may use Insulated Gate Bi-Polar Transistors (IGBTs) to convert from AC to DC. A boost converter or the like may step up the supplied voltage for an inverter, which may convert the DC to AC for the switched reluctance motor 304. The power electronics 306 may also include sensors or the like to monitor voltage and current, protection circuitry to prevent over-voltage or over-current, filtration circuitry to reduce fluctuations of current, and the like.

To control speed and torque of the machine 100, the power electronics 306 may include a power converter, an inverter controller, and units to facilitate the electric output from the power electronics 306 to the switched reluctance motor 304. The power electronics 306 may have a controller and/or units to regulate the supply of electric energy to the switched reluctance motor 304. The amount of electrical energy received by the switched reluctance motor 304 may be regulated by MOSFETs, IGBTs, and the like, which may, for example, connect each phase of the switched reluctance motor 304 to a current bus.

The power electronics 306 may include or be operatively linked with a controller which can receive inputs such as motor speed, motor torque, motor torque command, motor voltage and current, generator speed, and the like. The controller may have units and one or more processors to send commands from the power electronics 306 to the switched reluctance motor 304 and/or generator 302. The units and processors associated with the controller may store and analyze information to control the operation of the machine 100. The controller may also include any means for storing and comparing information and controlling an operating parameter of the machine 100. The controller may be configured to store and compare information including a memory, one or more data storage devices, or any other components that may be used to run an application associated with the operation of the machine 100.

The power electronics 306 may be configured to fit spatially with the generator 302 and/or the switched reluctance motor 304 in between the engine 202 and the gear reduction 210. The power electronics 306 could alternatively be mounted on a fuel tank. The generator 302 and the switched reluctance motor 304 may fit within the series electric drivetrain space claim 310 so that the series electric drivetrain space claim 310 is substantially similar to the mechanical drivetrain space claim 218 even with different components.

The gear reduction 210 in the electric drivetrain system of FIG. 3 may be operatively linked to the drive shafts 212. The front axial 214 and the rear axial 216 may each be operatively connected to the drive shaft 212. The front axial 214 and the rear axial 216 may both include the ground engaging members 104 such as the front and the rear wheels, respectively. Because of this arrangement, the gear reduction 210 may transfer torque from the switched reluctance motor 304 to the drive shafts 212 to operate the ground engaging members 104. Therefore, the switched reluctance motor 304 may drive one or more of the ground engaging members 104. Also, the generator 302 may operate at any speed. The power electronics 306 may receive the output of the generator 302 and may vary an input to the switched reluctance motor 304 to vary the speed to the drive shafts 212 with the help of the power electronics 306.

In an alternative aspect of the disclosure, the switched reluctance motor 304 and the generator 302 may be combined into one motor/generator component. Electric motor/generators may function either as an electric motor or an electric generator dependent upon if and how electric current is supplied to the electric motor/generator. The generator 302 and the switched reluctance motor 304 may also operate as one another during braking of the machine 100. For example, whenever brakes are applied to the machine 100, energy is removed from the machine 100. The faster the machine 100 is traveling, the more energy it has. The brakes of the machine 100 can capture some of this energy by using regenerative braking or the like. That is, instead of just using the brakes to stop the machine 100, the switched reluctance motor 304 may also slow the machine 100 by acting as the generator 302 while the machine 100 is slowing down. In addition, if the electric drivetrain system has excess energy, the generator 302 may act like the switched reluctance motor 304 by converting the excess energy in order to reduce fuel consumption and emissions from the engine 202.

The engine 202 may have an output shaft to rotate the generator 302. The machine 100 may also have a drive coupling to transmit torque between the engine 202 and the generator 302. The switched reluctance motor 304 may be further coupled with the generator 302 by power connections 308. The switched reluctance motor 304, together with the ground engaging members 104, the drive coupling, and the engine 202, encompasses a propulsion system for the machine 100.

The drive coupling may transmit torque between the engine 202 and the generator 302. The drive coupling may include or be coupled with a gear system, which may be a planetary gear system and may rotate a generator input shaft, in turn rotating the generator 302 and generating electrical power. The planetary gear system may increase the rotational speed provided by the engine 202, and may output torque from the engine 202 through a gear such as a sun gear to drive the generator 302. In one aspect, the output shaft and the generator input shaft are positioned in a coaxial configuration to provide a compact package. However, parallel axis gears, drive chains, belts, etc. might be used in aspects where the output shaft and the generator input shaft are non-coaxially arranged. An aspect of the generator 302 with an input shaft is described in more detail in regards to FIG. 4.

Because the mechanical drivetrain space claim 218 is comparable to the series electric drivetrain space claim 310, either the mechanical drivetrain components or the series electric drivetrain components may be installed during manufacturing. For the same reason, the components of the mechanical drivetrain space claim 218 are interchangeable with the components of the series electric drivetrain system 300, allowing for the retrofitting of an originally manufactured mechanical drivetrain system with the series electric drivetrain system.

For example, replacing the mechanical components of the mechanical drivetrain system may include removing mechanical components such as the torque converter 204, the drive shaft 206, and the multispeed transmission 208. The machine 100 may then be retrofit with the electrical components of the series electric drivetrain system 300, including the generator 302, the switched reluctance motor 304, and the like, which may be positioned between the engine 202 and the gear reduction 210 in an area defining the series electric drivetrain space claim 310 that is comparable to the mechanical drivetrain space claim 218 defined by the mechanical drivetrain system. The generator 302 and the switched reluctance motor 304 may also be operatively linked to the power electronics 306.

To replace the mechanical drivetrain system with the series electric drivetrain system 300 or to make the machine 100 compatible for both systems, there may be one or more interfaces between components. For example, in a first configuration, to connect the engine 202 with the generator 302, there may be an interface built into the generator 302 and/or the engine 202. Alternatively or additionally, there may be one or more additional components creating an interface between the engine 202 and the generator 302. To connect the torque converter 204 with the engine 202, there may be a direct connection interface between the engine 202 and the torque converter 204. The connection interface of the first configuration may be built into the engine 202 and/or the torque converter 204. Alternatively, there may be one or more secondary interface components in between the engine 202 and the torque converter 204. In yet another alternative aspect, the connection interface of the first configuration may be built into the engine 202 and/or both the generator 302 and the torque converter 204.

In a second configuration, the switched reluctance motor 304 may connect with the single speed ratio direct drive via a connection interface built into the switched reluctance motor 304 and/or the single speed ratio direct drive. Alternatively or additionally, there may be one or more additional components creating an interface between the switched reluctance motor 304 and the single speed ratio direct drive. To connect the multispeed transmission 208 with the gear reduction 210, there may be a direct connection interface between the multispeed transmission 208 and the gear reduction 210. The connection interface of the second configuration may be built into the multispeed transmission 208 and/or the gear reduction 210. Alternatively, there may be one or more secondary interface components in between the multispeed transmission 208 and the gear reduction 210. The first configuration and the second configuration may allow for replacing components of the mechanical drivetrain system with components of the series electric drivetrain system 300 with minimal modification.

When replacing the torque converter 204 with the generator 302, for example, an interface between the engine 202 and the torque converter 204 may need to be replaced to connect the engine 202 to the generator 302. The replacement of the interface may be minimal based on whether the interfaces are direct or indirect. For example, an electric generator to engine connection interface may have a configuration comparable to an engine to torque converter interface so that the replacement of the torque converter 204 with the generator 302 may only require minimal modification. Likewise, a switched reluctance motor 304 to gear reduction 210 connection interface may have a configuration that is comparable to a multispeed transmission 208 to gear reduction 210 connection interface. The gear reduction 210 may be a single speed ratio direct drive.

In one aspect, the series electric drivetrain system 300 and its components may bolt or otherwise connect to a frame of the machine 100. Additional components, such as hose and/or harness boss clippings may be welded or otherwise connected to the frame, but the ability to connect the series electric drivetrain system 300 by bolting its components into the series electric drivetrain space claim 310 allows for the convenient replacement of the mechanical drivetrain system with the series electric drivetrain system 300.

In addition, each of the components may have one or more support mechanisms to keep the components in a proper position. Replacing the components of the mechanical drivetrain system with the components of the series electric drivetrain system 300 may require replacing the support mechanisms and adding a support mechanism for the additional electrical components such as the power electronics 306. Alternatively, replacing the components of the mechanical drivetrain system with the components of the series electric drivetrain system 300 may not require replacing the support mechanisms, as the components may utilize common support connections.

Figure 4:
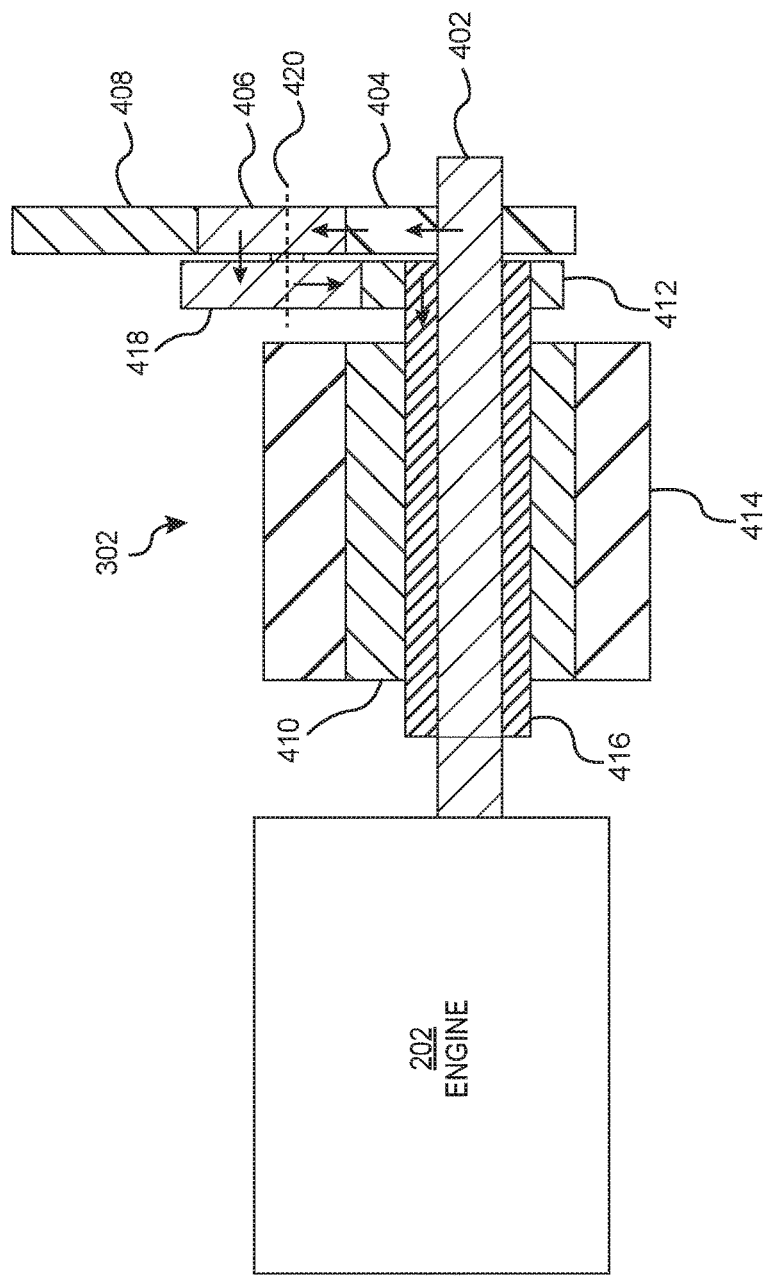
FIG. 4 illustrates a generator with a through shaft to connect to the engine according to the disclosure.

FIG. 4 illustrates one aspect of the generator 302 with an input shaft 602. In some aspects, the generator 302 is operatively linked with the engine 202 and the switched reluctance motor 304. In such aspects, hydraulic pumps and their corresponding pump drives may not easily fit within the series electric drivetrain space claim 310. In one aspect of arranging the generator 302 and the switched reluctance motor 304 within the series electric drivetrain space claim 310, the generator 302 may use the input shaft 402, which may extend through the generator 302 to facilitate conversion of the mechanical power from the engine 202 to electrical power from the generator 302, and may also drive one or more hydraulic pumps. The hydraulic pumps may include a steering and bucket pump, a lift pump, and the like. A rotor may rotate on the input shaft 402. The input shaft 402 may be used in combination with speed-up gearing or the like to allow the engine 202 to rotate the generator 302 at a speed different from the speed of the engine 202.

More specifically, the input shaft 402 may be operatively linked to and may rotate an input gear 404. The input gear 404 may be operatively linked to and rotate and idler gear 406. The idler gear 406 may be operatively linked to and rotate a pump drive gear 408, which may drive one or more hydraulic pumps to provide a hydraulic power output. The input gear 404 may drive the idler gear 406, and the idler gear 406 may drive the pump drive gear 408 to create a first speed up ratio. In another aspect, the idler gear 406 may be connected to and rotate in unison with a driven gear 418, and the driven gear 418 may drive a rotor gear 412 to create a second speed up ratio. In another aspect, the idler gear 406 may also rotate a shaft 420 and the corresponding driven gear 418. The driven gear 418 may rotate a rotor arm 410 via the rotor gear 412 rotating a drive shaft 416, which may be a hollow rotor shaft. The drive shaft 416 may be concentric with the input shaft 402. The input shaft 402 in combination with the speed-up gearing may allow the speed output by the engine 202 to drive pump speeds and control outputs of the generator 302. In an aspect, the rotor may be positioned on the hollow rotor shaft, the hollow rotor shaft having a first end and a second end, and the rotor may be rotatably supported by and about the input shaft 402. The first end of the hollow rotor shaft may be rotatably supported about the input shaft 402 at the generator to engine connection interface, and the second end may be rotatably supported about the input shaft and connected to the rotor gear 412.

The components of the series electric drivetrain system 300 may use a combination of speed-up gearing to produce various outputs. For example, speed-up gearing may be included with the engine 202 to maintain a low RPM output for emissions, fuel efficiency, and the like. Speed-up gearing may also be included with the generator 302 to provide optimal output for the generator 302 and for the hydraulic pumps. In one aspect of the disclosure, an output speed of the hydraulic pumps may be different from an output speed of the generator 302 and may provide a higher speed output than the RPM output of the engine 202. In such an aspect, the engine 202 may operate at a lower speed while the hydraulic pumps and the generator 302 may operate at higher speeds to produce the desired outputs which allow the series electric drivetrain system 300 to meet long run-out speeds and other output parameters without the multispeed transmission 208.

In another aspect, the input shaft 402 may extend through the generator 302 in order to reduce the space needed for the combination of the generator 302, the engine 202, the hydraulic pumps, and the switched reluctance motor 304. In particular, the positioning of the input shaft 402 may allow pumps and pump drives to be positioned within the series electric drivetrain space claim 310 while connecting to hydraulic lines and the like. When replacing the torque converter 204 with the generator 302, the input shaft 402 for the generator 320 may minimize the amount of adjustment required to implement the series electric drivetrain system 300.

INDUSTRIAL APPLICABILITY

This disclosure is applicable to machine 100, such as a wheel loader or track-type tractor, and specifically to a wheel loader or track-type tractor with a series electric drivetrain system which can meet the run out and stall torque performance of a corresponding mechanical drivetrain system while having a comparable space claim. Referring to FIGS. 2 and 3, the replacement of the mechanical drivetrain system illustrated in FIG. 2 with an electric drivetrain system may lead to an inefficient pairing of an electric motor/generator with the multispeed transmission 208. In addition, the electric drivetrain system will not fit easily within the comparable space occupied by the components of the mechanical drivetrain, and the weight of all the components may significantly increase when the electric drivetrain system components replace the mechanical drivetrain system components.

In order to replace the mechanical drivetrain system of FIG. 2 with a typical electric drivetrain system, substantial architectural changes are required due to the increased space claim required by the electric drivetrain system requiring a multispeed transmission. Substantial changes to connection interfaces between components may also be required. For example, the connection interface between the generator 302 and the engine 202 may be different than the connection interface between the engine 202 and the torque converter 204. Similarly, the connection interface between the switched reluctance motor 304 and the single speed ratio direct drive may be different than the connection interface between the torque converter 204 and the single speed ratio direct drive. In addition, the support mechanisms for the generator 302 and the switched reluctance motor 304 may be different than the support mechanisms for the torque converter 204 and the multispeed transmission 208. The addition of the power electronics 306 may also require additional support mechanisms for the series electric drivetrain system 300 which are not needed in the mechanical drivetrain system. There may also be challenges in aligning pumps and pump drives when adding the generator 302.

The machine 100 may therefore have support mechanisms which are common between the components of the mechanical drivetrain system and the series electric drivetrain system 300 or similar so that the components may be interchangeable without replacing or significantly modifying the support mechanisms. The connection interfaces may also be comparable between the components so that the generator 302 may replace the torque converter 204 without significant modification to connect the generator 302 instead of the torque converter 204 to the engine. Likewise, the switched reluctance motor 304 may replace the multispeed transmission 208 without significant modification to connect the switched reluctance motor 304 instead of the multispeed transmission 208 to the single speed ratio direct drive. The generator 302 may also include the input shaft 602 extending through the generator 302 to accommodate pump and pump drive placement and alignment.

Another advantage of the series electric drivetrain system 300 of the disclosure illustrated in FIG. 3 is that a use of a single speed ratio direct drive in combination with a switched reluctance motor 304 controlled by the power electronics 306 may allow the series electric drivetrain system 300 to meet the torque and run out speed performance of the mechanical drivetrain system without requiring the multispeed transmission 208. The use of a single speed ratio direct drive together with the switched reluctance motor 304 may also reduce or eliminate the need to change gears or use extra gear ranges, providing an operational advantage for the series electric drivetrain system 300.

The series electric drivetrain space claim 310 may also be comparable to the mechanical drivetrain space claim 218, making the replacement of the mechanical drivetrain system with the series electric drivetrain system 300 convenient even with different components. The comparable space claims may allow the components of each system to be arranged within the same area or volume. Because the series electric drivetrain system 300 illustrated in FIG. 3 may also match the performance of the mechanical drivetrain of FIG. 2 by using the switched reluctance motor 304 and the power electronics 306, the series electric drivetrain system 300 may reduce the need for a multispeed transmission 208, and thereby also reduce the weight of the system and the need for some mechanical connections. The series electric drivetrain system 300 in FIG. 3 may therefore reduce manufacturing complexity. In this regard, a manufacturer may produce a single machine with an architecture that can utilize either the mechanical drivetrain system or the series electric drivetrain system 300. Thus, the series electric drivetrain system 300 may interchange with the mechanical drivetrain system, or may be retrofit into a machine having a mechanical drivetrain system.

To replicate the performance of the mechanical drivetrain system, the power electronics 306 manage the connection between the generator 302 and the switched reluctance motor 304, and may control speed and torque of the machine 100 with a power converter, an inverter controller, and units to facilitate the electric output from the power electronics 306 to the switched reluctance motor 304. It is therefore the combination of the switched reluctance motor 304 and the single speed ratio direct drive controlled by the power electronics 306 which allows the series electric drivetrain system 300 to meet the operational performance of the mechanical drivetrain system.

The series electric drivetrain system 300, using the power electronics 306, may vary the speed of the machine 100 without requiring a change of gears because of a wide operational range of the switched reluctance motor 304. Thus, the series electric drivetrain system 300 with the switched reluctance motor 304 and the power electronics 306 may eliminate the need for multiple gears present in a transmission. The ability of the power electronics 306 to regulate the varying speed of the machine 100 with the single speed ratio direct drive with the switched reluctance motor 304 may also represent a reduction in space and weight required by a typical electrical drivetrain system using a multispeed transmission 208.

The switched reluctance motor 304 may mount directly to the gear reduction 210, reducing the need for a mechanical link and thereby reducing maintenance needs, costs, components, and/or weight. The switched reluctance motor 304 directly mounted to the gear reduction 210 may increase acceleration, reduce power consumption, and may otherwise render the performance of the series electric drivetrain system 300 more efficient than that of a similar mechanical drivetrain system. A switched reluctance motor 304 may also produce a high stall torque with a wide speed range.

Any aspect that is consistent with the disclosure should allow for the series electric drivetrain system 300 to have a comparable run out speed and stall torque performance of a corresponding mechanical drivetrain system using a multispeed transmission 208. This way, the series electric drivetrain system 300 may be retrofitted into the machine 100 by, for example, replacing the multispeed transmission 208 and the torque converter 204. The replacement of the mechanical drivetrain system components in FIG. 2 with the series electric drivetrain system 300 components illustrated in FIG. 3 may provide inter-changeability without significant architectural modifications and without significant changes in speed and torque performance.

The similar space claims provide an advantage at least because of the ability to replace a mechanical drivetrain system like the one shown in FIG. 2 with the series electric drivetrain system 300 that can meet the performance of the mechanical drivetrain system without significant modification to the machine 100.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A machine having a series electric drivetrain system, the machine comprising:
    an engine configured to provide mechanical energy to an electric generator;
    the electric generator configured to convert the mechanical energy received from the engine into electrical energy, the electric generator comprising an input shaft extending through the electric generator, a rotor configured to be rotatably supported by and about the input shaft, and the input shaft is configured to rotate an input gear, an idler gear, a pump drive gear, and a rotor gear;
    a motor configured to receive the electrical energy and to produce a rotational output;
    a single speed ratio direct drive configured to transfer the rotational output of the motor to a torque output to deliver to a drive shaft; and
    power electronics configured to control the electrical energy between the electric generator and the motor and to regulate the rotational output of the motor.

2. The machine of claim 1, wherein the electric generator and the motor are positioned between the engine and the single speed ratio direct drive in an area defining a series electric drivetrain space claim that is comparable to a mechanical drivetrain space claim defined by a mechanical drivetrain system, and the series electric drivetrain system is configured to operate in place of the mechanical drivetrain system.

3. The machine of claim 1, wherein the rotor is positioned on a hollow rotor shaft, the hollow rotor shaft having a first end and a second end.

4. The machine of claim 3, wherein the first end of the hollow rotor shaft is rotatably supported about the input shaft at the electric generator to engine connection interface and the second end is rotatably supported about the input shaft and connected to the rotor gear.

5. The machine of claim 1, wherein the electric generator and hydraulic pumps each use speed-up gearing configured to produce an output speed wherein an output speed of the engine is less than the output speed of the electric generator and the hydraulic pumps.

6. The machine of claim 5, wherein the input gear drives the idler gear and the idler gear drives the pump drive gear to create a first speed up ratio; and
    the idler gear is connected to and rotates in unison with a driven gear, the driven gear drives the rotor gear to create a second speed up ratio.

7. The machine of claim 6, wherein the series electric drivetrain system using the single speed ratio direct drive is configured to provide a stall torque and run out performance that is consistent with a mechanical drivetrain system using a multispeed transmission.

8. A machine comprising:
    an engine configured to provide mechanical energy to an electric generator;
    the electric generator configured to convert the mechanical energy received from the engine into electrical energy and into hydraulic power, and the electric generator comprising an input shaft extending through the electric generator, a rotor configured to rotate on the input shaft, and the input shaft is configured to rotate an input gear, an idler gear, a pump drive gear, and a rotor gear;
    a motor configured to receive the electrical energy and to produce a rotational output;

a single speed ratio direct drive configured to transfer the rotational output of the motor to a torque output to deliver to a drive shaft; and power electronics configured to transmit the electrical energy between the electric generator and the motor and to regulate the rotational output of the motor.

9. The machine of claim 8, wherein the electric generator and the motor are positioned between the engine and the single speed ratio direct drive in an area defining a series electric drive space claim that is comparable to a mechanical drivetrain space claim defined by a mechanical drivetrain system, and a series electric drivetrain system comprising the engine, the electric generator, the motor, and the single speed ratio direct drive is configured to operate in place of the mechanical drivetrain system.

10. The machine of claim 8, wherein the rotor is positioned on a hollow rotor shaft, the hollow rotor shaft having a first end and a second end.

11. The machine of claim 10, wherein the first end of the hollow rotor shaft is rotatably supported about the input shaft at the electric generator to engine connection interface and the second end is rotatably supported about the input shaft and connected to the rotor gear.

12. The machine of claim 9, wherein the electric generator and hydraulic pumps each use speed-up gearing configured to produce an output speed wherein an output speed of the engine is less than the output speed of the electric generator and the hydraulic pumps.

13. The machine of claim 12, wherein the input gear drives the idler gear and the idler gear drives the pump drive gear to create a first speed up ratio; and the idler gear is connected to and rotates in unison with a driven gear, the driven gear drives the rotor gear to create a second speed up ratio.

14. The machine of claim 13 wherein the series electric drivetrain system using the single speed ratio direct drive is configured to provide a torque and run out performance that is consistent with a mechanical drivetrain system using a multispeed transmission.

15. A method of replacing a mechanical drivetrain system with a series electric drivetrain system, the method comprising:

removing mechanical components from the mechanical drivetrain system; and replacing the mechanical components of the mechanical drivetrain system with power electronics and with electrical components of the series electric drivetrain system, wherein:

the electrical components of the series electric drivetrain system comprise a switched reluctance motor and an electric generator with an input shaft extending through the electric generator, the electrical components positioned between an engine and a single speed ratio direct drive in an area defining a series electric drive space claim that is comparable to a mechanical drivetrain space claim defined by the mechanical drivetrain system.

16. The method of claim 15, wherein removing the mechanical components of the mechanical drivetrain system comprises removing a torque converter, a multispeed transmission, and a drive shaft.

17. The method of claim 16, wherein replacing the multispeed transmission further comprises replacing the multispeed transmission with the switched reluctance motor, wherein the single speed ratio direct drive is configured to transfer a rotational output of the switched reluctance motor to a torque output to ground engaging members.

18. The method of claim 17, wherein a stall torque and run out performance of the series electric drivetrain system is comparable to the mechanical drivetrain system.

19. The method of claim 18, further comprising driving ground engaging members with the switched reluctance motor and the single speed ratio direct drive to provide a stall torque and run out performance with the series electric drivetrain system that is comparable to the mechanical drivetrain system.

20. The method of claim 15, wherein the series electric drive space claim has a volume that is comparable to a volume of the mechanical drivetrain space claim.

* * * * *